United States Patent
Langford et al.

[11] Patent Number: 5,981,426
[45] Date of Patent: Nov. 9, 1999

[54] PHOTOCATALYST HAVING AN X-RAY DIFFRACTION PATTERN WHICH IS SUBSTANIALLY FREE OF CHARACTERISTIC REFLECTIONS ASSOCIATED WITH CRYSTALLINE TIO₂

[75] Inventors: Cooper H. Langford; Yiming Xu, both of Calgary, Canada

[73] Assignee: University Technologies International Inc., Canada

[21] Appl. No.: 08/920,357

[22] Filed: Aug. 29, 1997

Related U.S. Application Data

[63] Continuation of application No. PCT/CA96/00128, Mar. 2, 1996, which is a continuation of application No. 08/397,645, Mar. 2, 1995, abandoned.

[51] Int. Cl.⁶ .............. B01J 37/34; B01J 21/06; B01J 23/30
[52] U.S. Cl. .................. 502/309; 502/4; 502/5; 502/305; 502/350
[58] Field of Search ............. 502/4, 5, 60, 305, 502/309, 350

[56] References Cited

U.S. PATENT DOCUMENTS

| | | | |
|---|---|---|---|
| 2,605,238 | 7/1952 | Krantz | 252/469 |
| 4,833,113 | 5/1989 | Imanari et al. | 502/309 |
| 5,100,858 | 3/1992 | Chopin et al. | 502/350 |
| 5,162,283 | 11/1992 | Moini | 502/236 |
| 5,468,699 | 11/1995 | Zhang et al. | 502/60 |
| 5,686,372 | 11/1997 | Langford et al. | 502/242 |
| 5,690,922 | 11/1997 | Mouri et al. | 424/76.1 |
| 5,712,461 | 1/1998 | Zhang et al. | 204/157.15 |
| 5,759,948 | 6/1998 | Takaoka et al. | 502/325 |

FOREIGN PATENT DOCUMENTS

| | | | |
|---|---|---|---|
| 0455491 | 11/1991 | European Pat. Off. | B01D 53/36 |
| 63-171615 | 7/1988 | Japan | B01D 39/14 |
| 596181 | 4/1993 | Japan | B01J 35/02 |

*Primary Examiner*—Michael Lewis
*Assistant Examiner*—Alexander G. Ghyka
*Attorney, Agent, or Firm*—Fitzpatrick, Cella, Harper & Scinto

[57] ABSTRACT

A photocatalyst compound comprising: (i) a photocatalyst selected from the group consisting of $TiO_2$, $WO_3$ and mixtures thereof, the photocatalyst being substantially free of sharp, narrow band X-ray reflections at angles corresponding those of crystalline $TiO_2$, $WO_3$ and mixtures thereof, and (ii) a porous, crystalline, adsorbent support material. A process for producing the photocatalyst compound is also disclosed. The process comprises: (i) hydrolysing a non-ionic titanium compound to produce a colloidal suspension having an average particle size of less than about 250 Å; (ii) contacting a porous, crystalline, adsorbent support material with the colloidal suspension to produce an impregnated support; and (iii) calcining the impregnated support to produce the photocatalyst compound. The photocatalyst compound is useful, in the treatment of a fluid containing an organic pollutant.

37 Claims, 9 Drawing Sheets

PHOTOCATALYST HAVING AN X-RAY DIFFRACTION PATTERN WHICH IS SUBSTANIALLY FREE OF CHARACTERISTIC REFLECTIONS ASSOCIATED WITH CRYSTALLINE TIO₂

This is a continuation application of PCT/CA96/00128 filed Mar. 2, 1996 (designated the United States) which is a continuation of U.S. Pat. application Ser. No. 08/397,645, filed Mar. 2, 1995 (now abandoned).

BACKGROUND OF THE INVENTION

1. Field of the Invention

The present invention relates to a photocatalyst compound and to a process for production thereof.

2. Description of the Prior Art

Photocatalysis is known and has application in treatment of fluids such as water containing pollutants.

Conventionally, a photocatalyst such as titanium dioxide ($TiO_2$) is added to the fluid to be treated to form a slurry. The slurry is then exposed to electromagnetic radiation which would result in the catalytic destruction or decomposition of the pollutants in the fluid. For $TiO_2$, radiation having a wavelength of less than or equal to about 380 nm results in catalytic destruction or decomposition of the pollutants in the fluid.

It is known in the art to load $TiO_2$ on a support to facilitate recovery of the $TiO_2$ in a specific place. However, as is known in the art, $TiO_2$ is a relatively poor adsorber of, inter alia, organic compounds and there has been little or no attention given to this in the art.

Indeed, much of the prior art has focused on methods of immobilizing the photocatalyst $TiO_2$ directly on to the support material. Generally, this technique involves thermal fusing of $TiO_2$ to a support material such as silica gel, etched glass beads, interior of glass tubes, Teflon™ tubing, woven glass mesh, sand and the like. See, for example, any of the following prior art references:

1. Serpone et al., *Solar Energy. Mater.* 14, 121 (1986),
2. Matthews et al., *Anal. Chim. Acta.* 223, 171 (1990),
3. Matthews, *Solar Energy Mater.* 38, 405 (1987),
4. U.S. Pat. No. 5,182,030 (Crittenden et al.),
5. Australian patent application PH7074 (Mattews),
6. Stakheev et al., *J. Phys. Chem.* 97, 5668 (1993),
7. Matthews, *Wat. Res.* 25, 1169 (1991),
8. Yoneyana et al., J. Phys. Chem. 93 4833 (1989),
9. Yamanaka et al., *Mater. Chem. Phys.* 17, 87 (1987),
10. Minero et al., *Langmuir* 8, 481 (1992), and
11. U.S. Pat. No. 4,495,041 (Goldstein), the contents of each of which are hereby incorporated by reference.

While there appears to exist a commercial interest in $TiO_2$-based photocatalysis for the destruction or decomposition of pollutants in water, the known systems suffer from a number of disadvantages.

Specifically, a disadvantage of the work done to date is that, with most of the supported $TiO_2$ photocatalysts, there is a drop-off in the photoactivity of the photocatalysts compared to the photoactivity of unsupported $TiO_2$ photocatalyst.

Yet another disadvantage is that, with most of the prior art supported $TiO_2$ photocatalysts, there is a drop-off in the adsorption of pollutants by the photocatalysts compared to the adsorption characteristics of the support material, per se, due to the unfavourable adsorption characteristics of $TiO_2$.

It would be desirable to have a photocatalyst compound alleviate at least one of the above-identified disadvantages of the prior art.

SUMMARY OF THE INVENTION

It is an object of the present invention to provide a novel photocatalyst compound which obviates or mitigates at least one of the above-mentioned disadvantages of the prior art.

It is another object of the present invention to provide a novel process for producing a photocatalyst compound.

Accordingly, in one of its aspects, the present invention provides a photocatalyst compound comprising: (i) a photocatalyst selected from the group consisting of $TiO_2$, $WO_3$ and mixtures thereof, the photocatalyst being substantially free of sharp, narrow band X-ray reflections at angles corresponding those of crystalline $TiO_2$, $WO_3$ and mixtures thereof, and (ii) a porous, crystalline, adsorbent support material.

In another of its aspects, the present invention provides a process for producing a photocatalyst compound comprising the steps of:

(i) hydrolysing a non-ionic titanium compound to produce a colloidal suspension having an average particle size of less than about 250 Å;

(ii) contacting a porous, crystalline, adsorbent support material with the colloidal suspension to produce an impregnated support; and (iii) calcining the impregnated support to produce a photocatalyst compound comprising a $TiO_2$ photocatalyst, the photocatalyst being substantially free of sharp, narrow band X-ray reflections at angles corresponding those of crystalline $TiO_2$.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Thus, in one of its aspects, the present invention relates to a photocatalyst compound comprising (i) a photocatalyst selected from the group comprising $TiO_2$, $WO_3$ and mixtures thereof wherein the photocatalyst does not exhibit sharp, narrow band X-ray reflections at angles corresponding those of crystalline $TiO_2$, $WO_3$ and mixtures thereof, and (ii) a porous, crystalline, adsorbent support material.

The photocatalyst is $TiO_2$, $WO_3$ or a mixture thereof which, using currently available analytical techniques, could be classified as "non-crystalline". As used herein, the term "non-crystalline", when used in regard to $TiO_2$, $WO_3$ or mixtures thereof, is intended to connote that the material in question does not exhibit sharp, narrow band X-ray reflection at angles corresponding to those of crystalline $TiO_2$, $WO_3$ and mixtures thereof. Thus, the photocatalyst useful in the present photocatalyst compound can be considered amorphous and free of long range order. For example, in the case of $TiO_2$, the present photocatalyst compound comprises $TiO_2$ which does not exhibit the sharp narrow band X-ray reflections at angles where such reflections are characteristic of the presence of the anatase ($2\theta$ of approximately 25.2) crystalline form of $TiO_2$. Further, the characteristic X-ray reflections normally seen for the rutile ($2\theta$ of approximately 27.3) or brookite crystalline ($2\theta$ of approximately 30.8) forms of $TiO_2$ are not apparent in the present photocatalytic compounds for example, compare FIGS. 1 and 2 (to be discussed in more detail below). The term "substantially free of characteristic reflections associated with crystalline $TiO_2$, $WO_3$," used herein denotes the relationship described above.

Figure 5:
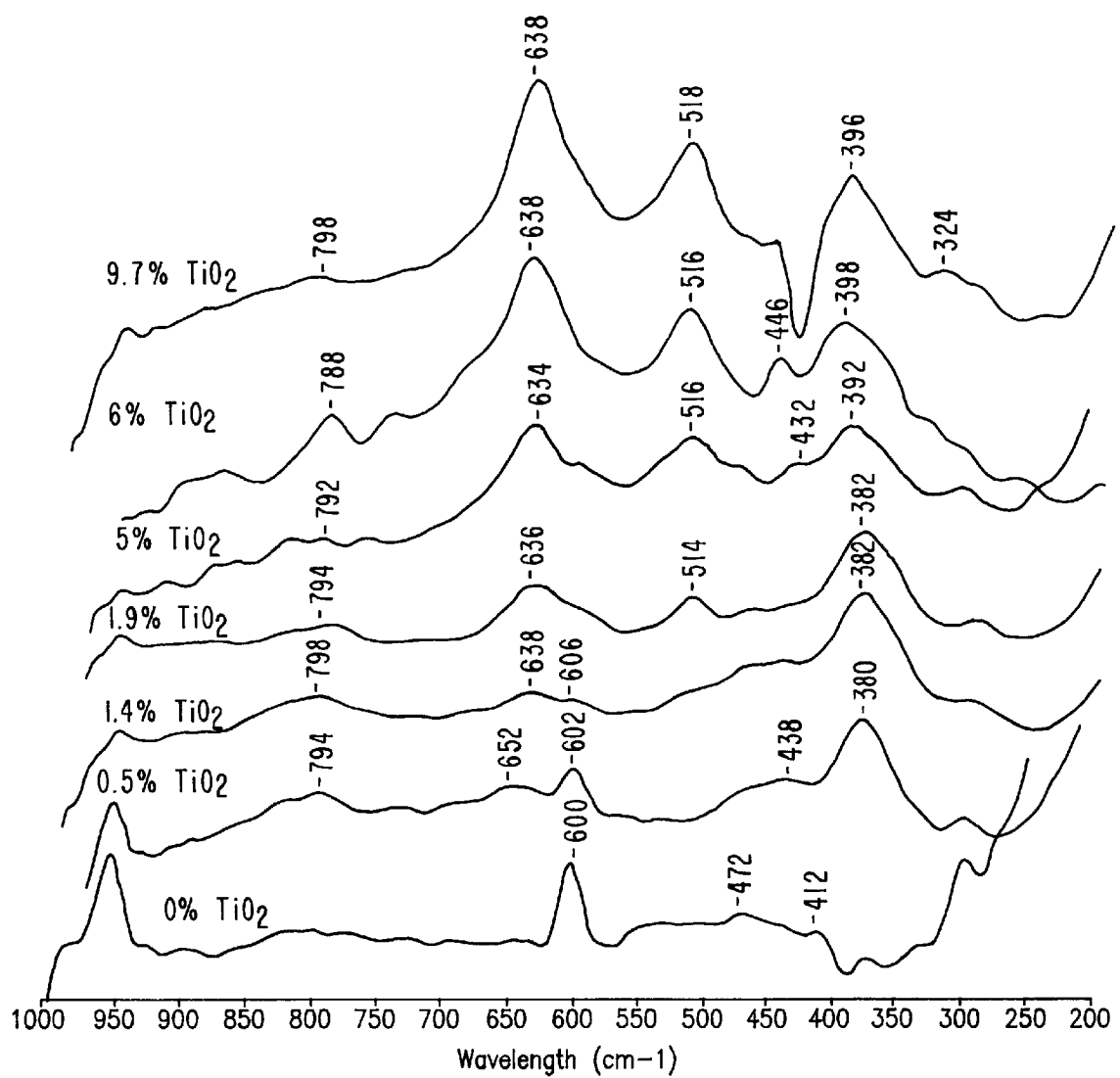
FIG. 5 illustrates Raman spectra for ZSM5 zeolite and various photocatalysts based on $TiO_2$ and ZSM5 zeolite.
Figure 6:
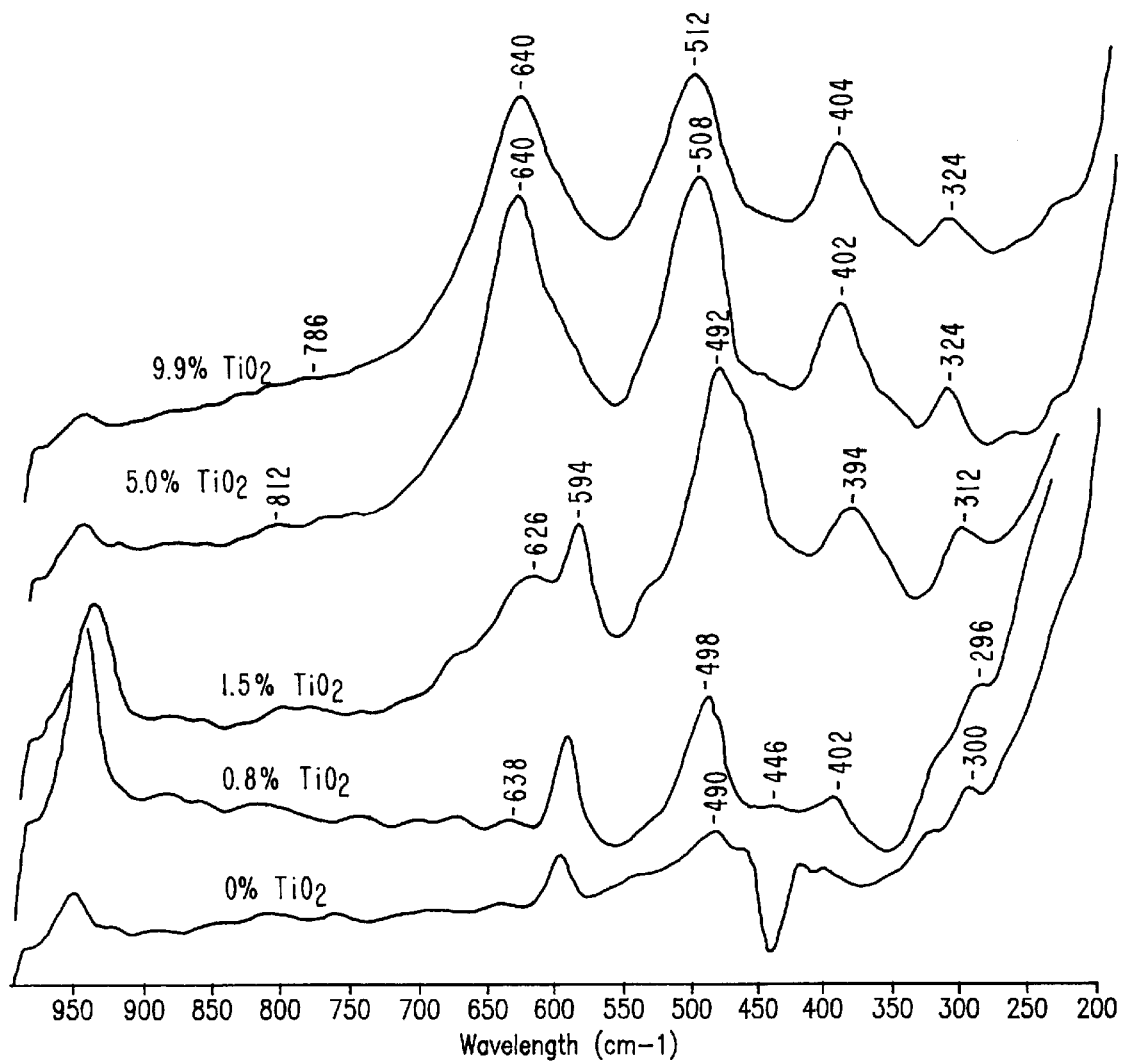
FIG. 6 illustrates Raman spectra of Zeolite A and various photocatalyst compounds based on $TiO_2$ and Zeolite A.

The Raman spectra of present photocatalyst compounds is further characteristic of the presence of $TiO_2$, $WO_3$ or mixtures thereof in an amorphous state. The Raman spectra of, inter alia, crystalline $TiO_2$ and $WO_3$ are discussed in "Spectroscopic Characterization of Supported Metal Oxide Catalysts" by M. A. Vuurman (1992, PhD research thesis conducted at the University of Amsterdam), the contents of which are hereby incorporated by reference. Specifically, with reference to Chapter 6 of Vuurman, FIG. 5 illustrates the Raman spectra for various loadings of $WO_3$ on alumina. Vuurman teaches (see page 97) that crystalline $WO_3$ particles have characteristic or "major" bands at 808, 711, 321 and 273 $cm^{-1}$. With further reference to Chapter 6 of Vuurman, FIG. 6 illustrates the Raman spectra for various loading levels of $TiO_2$ on alumina. Vuurman teaches (see page 100) that crystalline $TiO_2$ particles have characteristic or "major" bands at 643, 520, 394 and 144 $cm^{-1}$. As discussed above, the present photocatalyst compounds comprise TiO2, $WO_3$ or mixtures thereof in an amorphous state. In such a state, the $TiO_2$, $WO_3$ or mixtures thereof comprised in the present photocatalyst compounds, particularly give rise to Raman spectra which do not exhibit such characteristic or "major" bands.

In the present photocatalyst compounds, the photocatalyst (i.e. $TiO_2$, $WO_3$ or mixtures thereof) forms a very thin amorphous layer which substantially completely covers the external surface of the adsorbent support material. This feature is particularly prevalent at relatively low loading levels of the $TiO_2$, $WO_3$ or mixtures thereof (e.g. less than about 10% by weight of the photocatalyst compound) and is believed to be at least partially responsible for the enhanced photoactivity of this preferred subset of the present photocatalyst compounds.

The adsorbent support material suitable for use in the present photocatalyst compounds is porous and crystalline. Preferably, the support material has an average pore size in the range of from about 5 Å to about 15 Å, preferably from about 7 Å to about 12 Å.

The crystallinity of the adsorbent support material is an important feature. Specifically, the adsorbent support material should have a crystallinity of at least about 50%, more preferably at least about 60%, even more preferably at least about 70%, most preferably at least about 85%. The crystallinity of the support material can be readily determined by a person of skill in the art, for example, by means of comparison of the intensity of X-ray diffraction reflections for a given adsorbent support material with that of a crystalline material derived by a standard preparation.

Preferably, the adsorbent support material is zeolite (e.g. Zeolite A), more preferably a hydrophobic zeolite comprising a relatively high content of silicon, most preferably a silicon to aluminum weight ratio of from about 10:1 to about 100:1. Non-limiting examples of zeolites which are useful in the present invention may be selected from the group consisting of ZSM5, Zeolite A and mixtures thereof. As is known in the art, for a given zeolite material, there is some latitude to vary the silicon to aluminum weight ratio. It is contemplated that this latitude can be used to modify other zeolites such as other ZSM zeolites, Zeolite Y and Zeolite X to be useful in the present photocatalyst compounds.

While zeolites are the preferred choice for use as the adsorbent support material in the present photocatalyst compounds, non-zeolite materials may also be used. A preferred class of such materials is molecular sieves, more preferably hydrophobic molecular sieves. Non-limiting examples of suitable molecular sieves include titanium silicates (e.g. TS1), aluminum phosphates (also known as ALPO's) and members of the MCM family (e.g. MCM-10). Of course it is important that the zeolite chosen be of a crystalline nature as discussed hereinabove.

A portion of the $TiO_2$ and/or $WO_3$ be substituted with at least one transition metal of the Periodic Table. Preferably, the substitution will be up to about 5% by weight, more preferably up to about 2% by weight, of the photocatalyst compound.

More preferably the transition metal is selected from the fourth period of the Periodic Table. Most preferably, the transition metal is selected from the group consisting of iron, vanadium, chromium and mixtures thereof. The preferred photocatalyst to be used in the photocatalyst compound of the present invention is substantially non-crystalline $TiO_2$. While, in broad terms, the loading of $TiO_2$ in the photocatalyst compound is not generally restricted, the present inventors have discovered a particularly useful class of photocatalyst compounds which have a characteristic loading of the substantially non-crystalline $TiO_2$ in the range of from about 0.5% to about 10%, more preferably from about 2% to about 9%, most preferably from about 2% to about 6%, by weight of the photocatalyst compound. This class of photocatalyst compounds has been surprising and unexpectedly found to have enhanced specific activity compared to photocatalyst compounds which employ one or more of the following: (i) more than 10% by weight of $TiO_2$, (ii) unsupported crystalline $TiO_2$ and (iii) photocatalysts supported on non-crystalline adsorbent support materials (e.g. various aluminas and silicas).

As discussed, hereinabove, an aspect of the present invention a process for producing a photocatalyst compound comprising the steps of:

(i) hydrolysing a non-ionic titanium compound to produce a colloidal suspension having an average particle size of less than about 250 Å;

(ii) contacting a porous, crystalline, adsorbent support material with the colloidal suspension to produce an impregnated support; and (iii) calcining the impregnated support to produce a photocatalyst compound comprising a $TiO_2$ photocatalyst, the photocatalyst being substantially free of sharp, narrow band X-ray reflections at angles corresponding those of crystalline $TiO_2$.

Thus, Step (i) of the process involves starting with a non-ionic titanium compound, a tungsten compound or a mixtures thereof. Preferably, the starting material is one a non-ionic titanium compound and a tungsten compound. Preferably, the non-ionic titanium compound is selected from the group consisting of $TiCl_4$, $Ti(OR)_4$ and mixtures thereof, wherein R is a $C_1$–$C_{10}$ alkyl group. The preferred group for R is propyl. The starting material is subjected to hydrolysis to produce a colloidal suspension having an average particle size of less than about 250 Å. If the average particle size exceeds about 250 Å, there is a significant likelihood of the occurrence of agglomerations of the photocatalyst. Preferably the starting material is initially dissolved in a suitable water-miscible organic solvent prior to hydrolysis. This may be achieved by, for example, slow addition to the starting material of a stoichiometric amount of water over a period of time which is longer that the rate of the hydrolysis reaction. This can be done by controlling addition of the water to a rate which is slow enough to ensure that each addition of water leads to hydrolysis. The result is a colloidal suspension having an average particle size of less than about 250 Å, preferably in the range of from about 20 Å to about 100 Å, more preferably in the range of from about 20 Å to about 75 Å. This suspension may be considered as sol. More information on the general preparation of sols may be found in *J. Membrane Sci.*, 1988, 39, 243 (Anderson et al.), the contents of which are hereby incorporated by reference.

In Step (ii) of the process, the colloidal suspension is used to impregnate the adsorbent support material. Generally, this involves contacting the adsorbent support material with the colloidal suspension produced in Step (i) of the process. Preferably, the contacting is done with mixing. While the duration of contact between the colloidal suspension and the adsorbent support material is not particularly restricted, it is preferred that duration of contact be at least about 1 hour. After the colloidal suspension and the adsorbent support material have been contacted for a period sufficient to effect impregnation of the latter, the impregnated support material may be isolated by any conventional physical separation technique (e.g. gravity filtration and the like). Thereafter, it is preferred to dry the impregnated support material. This can be done by air drying at a temperature in the range of from about 20° to about 150° C.

In Step (iii) of the process, the impregnated support material is calcined to produce a photocatalyst compound comprising a photocatalyst selected from the group consisting of $TiO_2$, $WO_3$ and mixtures thereof, the photocatalyst being substantially free of sharp, narrow band X-ray reflections at angles corresponding those of crystalline $TiO_2$, $WO_3$ and mixtures thereof. The conditions of calcination are not particularly restricted and are generally within the purview of a person skill in the art. Preferably, calcination is conducted at a temperature in the range of from about 250° to about 500° C. for a period of at least about 12 hours.

When it is desired to produce a photocatalyst compound loaded with $WO_3$, it is preferred to contact the support material with a tungstate compound, preferably a metatungstate compound, more preferably ammonium metatungstate $((NH_4)_6H_2W_{12}O_{40})$. This results in impregnation of the support material, which can then be separated, dried, and calcined as described above.

The present photocatalyst compound is useful in the treatment fluids containing, inter alia, organic pollutants. Generally, the photocatalyst compound can be used to catalyze photooxidation of the pollutants. This can be done by disposing the photocatalyst compound in the fluid to be treated and irradiating the fluid with radiation of a suitable wavelength. The treatment process can be continuous or batch-wise. The design of a suitable fluid treatment system incorporating the present photocatalyst compound is within the purview of those of skill in the art.

Embodiments of the present invention will be described with reference to the following Examples which should not be construed as limiting the invention.

EXAMPLE 1

A reactant composition comprising 200 mL, 1 mL nitric acid and 28.1 g titanium (IV) tetraisopropoxide (97% pure, Aldrich) was dissolved in 10 mL ethanol. The resulting slurry was peptized for 8 hours to produce a $TiO_2$ sol. More information on this procedure may be obtained *J. Membrane Sci.*, 1988, 39, 243 (Anderson et al.), the contents of which are hereby incorporated by reference.

The $TiO_2$ photocatalyst was supported on the following materials:

| Designation | Support Material |
| --- | --- |
| A | ZSM5 zeolite |
| B | Zeolite A |
| C | Alumina |
| D | Silica |

The ZSM5 zeolite was synthesized under hydrothermal conditions in a Teflon™-lined autoclave using the procedure described in U.S. Pat. No. 3,702,866 (Arganer et al.), the contents of which are hereby incorporated by reference. The molar chemical composition of the resulting gel was:

$2.8Na_2O:Al_2O_3:37SiO_2:448H_2O:8.3TPAB$ (TPAB=tetrapropylammoniumbromide). Crystallization was done statically at 175° C. over a period of 10 days. The resulting crystalline solid was filtered, washed with water, dried at 120° C. overnight and calcined at 550° C. for a period of 12 hours in dry air. The structure of the ZSM5 zeolite was confirmed by a comparative analysis with the known structure of the zeolite—see "Collection of Simulated XRD Powder Patterns for Zeolites. A Special Issue of Zeolites", *Int. J. Molecular Sieves*, 1990, 10(5), 323–520 (Ballmoos et al.), the contents of which are hereby incorporated by reference.

Zeolite A was obtained from Aldrich. This zeolite had the following chemical composition:

$0.2Na_2O:0.8CaO:Al_2O_3:2SiO_2:xH_2O$ and was characterized by an average particle size of 3–5 μm.

The alumina was an acidic type obtained from B2.

The silica was Silica Gel 100 obtained from EM Science. The silica gel had particle diameters ranging from 0.063 to 0.200 mm, a mean pore diameter of 100 Å, a specific surface area of 420 m²/g and a pore volume of 1.05 mL/g. The pH of a 10% aqueous suspension of the silica gel was determined to be 7.0–7.5.

The general technique for loading the TiO$_2$ on to the support material was as follows. A suspension of 4.5 g of the support material saturated with 10 mL water was mixed for ½ hour. The suspension was then mixed, with stirring, with 5 mL of the TiO$_2$ sol. The mixture was dried by evaporation at 50° C. over a period of 2 to 3 hours. Thereafter, the dried mixture was heated at 120° overnight and calcined at 450° C. for a period of 11–12 hours. Using this general technique, various Samples of photocatalyst compounds were produced with a varying content of TiO$_2$ on each support material, as indicated in Tables 1–4 (A, B, C and D have the designations discussed above).

TABLE 1

| Sample | TiO$_2$ (% by weight) |
|---|---|
| A-1 | 0 |
| A-2 | 1.4 |
| A-3 | 5.0 |
| A-4 | 9.7 |
| A-5 | 14.3 |
| A-6 | 18.6 |

TABLE 2

| Sample | TiO$_2$ (% by weight) |
|---|---|
| B-1 | 0 |
| B-2 | 1.5 |
| B-3 | 3.8 |
| B-4 | 9.9 |
| B-5 | 14.6 |
| B-6 | 21.0 |
| B-7 | 39.5 |

TABLE 3

| Sample | TiO$_2$ (% by weight) |
|---|---|
| C-1 | 0 |
| C-2 | 1.8 |
| C-3 | 3.3 |
| C-4 | 7.9 |
| C-5 | 13.5 |
| C-6 | 21.2 |
| C-7 | 34.2 |

TABLE 4

| Sample | TiO$_2$ (% by weight) |
|---|---|
| D-1 | 0 |
| D-2 | 2.1 |
| D-3 | 5.9 |
| D-4 | 19.6 |
| D-5 | 24.4 |
| D-6 | 34.5 |

As will be apparent to those of skill in the art, Samples C-1 through C-7 (alumina support material) and D-1 through D-6 (silica support material) are for comparative purposes only and thus, are outside the scope of the present invention.

Also for comparative purposes, a sample of TiO$_2$ was obtained from Degussa Corporation under the tradename P25 and designated herein as CON-1. For further comparative purposes, an unsupported TiO$_2$ photocatalyst was produced by evaporation of the solvent in the TiO$_2$ sol (described above) to produce a white powder. The white powder was then heated at 120° C. overnight. The dried product was designated CON-3. The dried product was then calcined at 450° C. for a period of 11–12 hours to produce a calcined product which was designated CON-2. These various unsupported TiO$_2$ photocatalysts are referred to in FIG. 1.

X-ray powder diffraction patterns were recorded using CuKα radiation (λ=1.54059 Å) on a Scintag XDS 2000 X-ray diffractometer. Diffraction patterns were taken over the 2θ range of 5° to 50° and the results were treated with the Jade program for XRD pattern-processing (Materials Data, Inc.) The crystallinity of Zeolite A was determined by measuring the total peak area under eight main peaks over the 2θ range of 5° to 35°.

Figure 1:
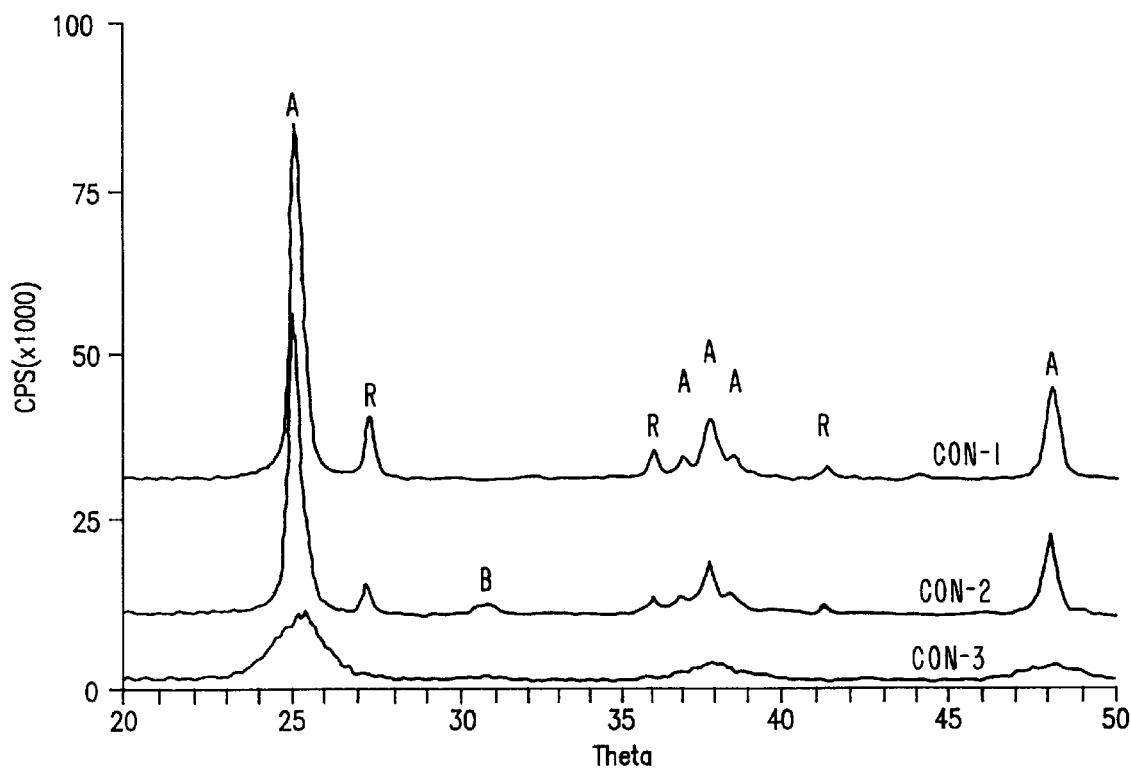
FIG. 1 illustrates X-ray diffraction patterns for a number of unsupported $TiO_2$ photocatalysts.

With reference to FIG. 1, it will be apparent to those of skill in the art that the principal constituent of each of CON-1, CON-2 and CON-3 is the anatase (A) crystalline form of TiO$_2$. The rutile (R) and brookite (B) crystalline forms of TiO$_2$ are present at in relatively minor amounts.

Figure 3A:
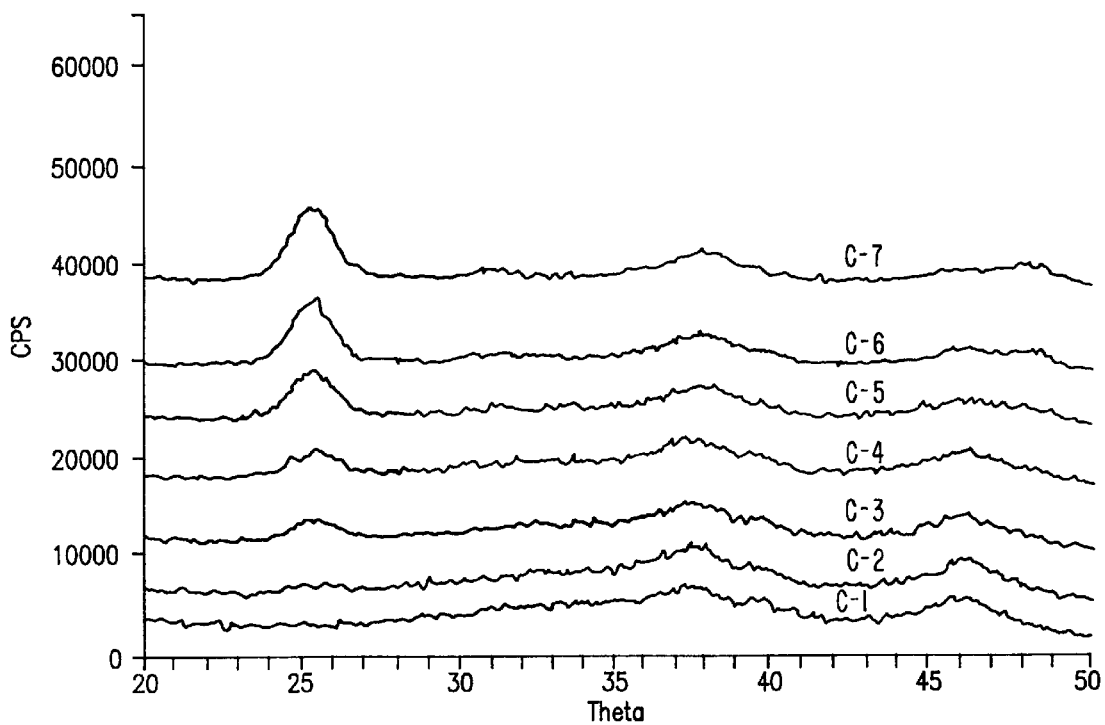
FIG. 3(a) illustrates X-ray diffraction patterns for various photocatalyst based on $TiO_2$ and alumina.
Figure 3B:
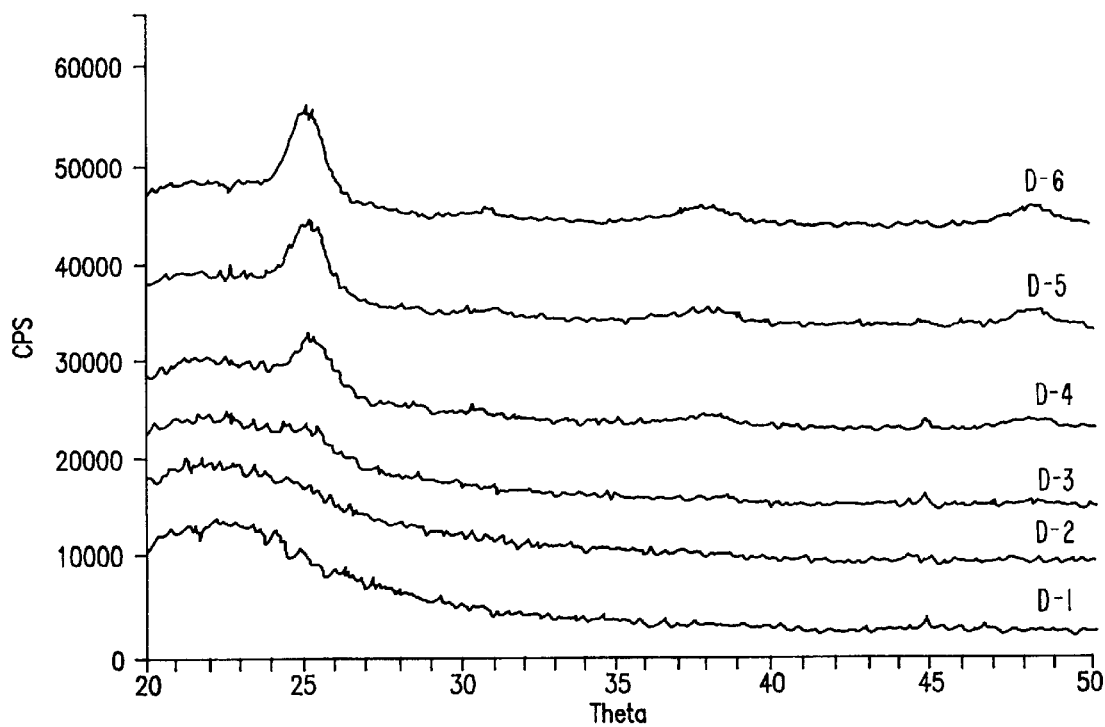
FIG. 3(b) illustrates X-ray diffraction patterns for various photocatalyst based on $TiO_2$ and silica.

With reference to FIG. 3, it will be apparent to those of skill in the art that the characteristic anatase-, rutile- and brookite-attributable peaks found in FIG. 1 are also present in Samples produced using alumina (FIG. 3(a)) and silica (FIG. 3(b)) as the support material. This is strong evidence that use of alumina and silica as a support material results in loading of TiO$_2$ having relatively high crystallinity.

Figure 2A:
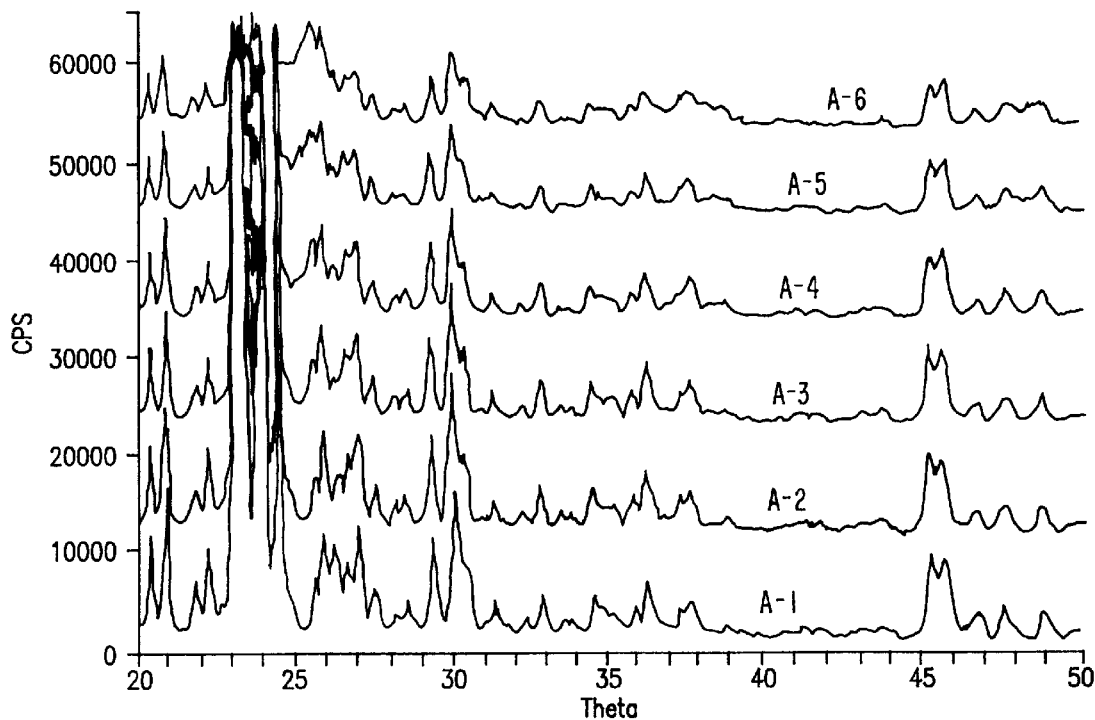
FIG. 2(a) illustrates X-ray diffraction patterns for various photocatalyst compounds based on $TiO_2$ and ZSM5 zeolite.
Figure 2B:
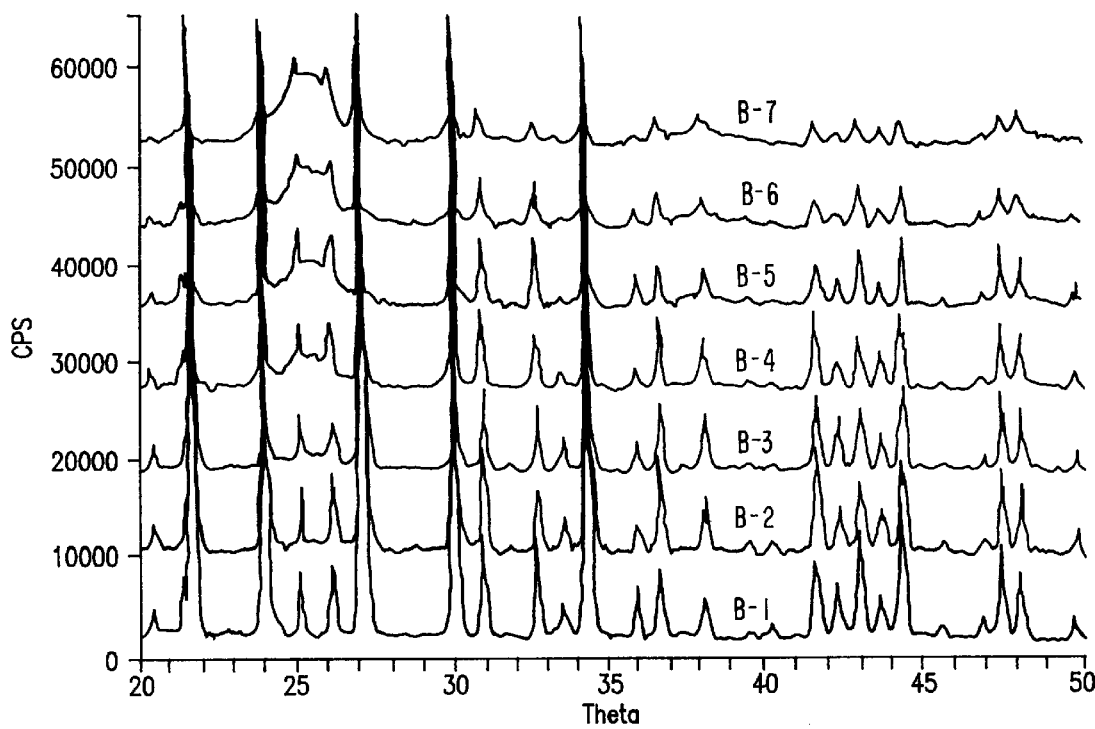
FIG. 2(b) illustrates X-ray diffraction patterns for various photocatalyst compounds based on $TiO_2$ and Zeolite A.

In contrast, with reference to FIG. 2, it will be apparent to those of skill in the art that the overriding feature of the pattern for each sample is the presence of TiO$_2$ which lacks the narrow, sharp characteristic anatase-, rutile- or brookite-attributable peaks found in FIG. 1. This is especially true for those Samples having a TiO$_2$ loading level of less than about 10% by weight TiO$_2$ (i.e. A-1 through A-4 and B-1 through B-4). This is strong evidence that use of the chosen zeolites as a support material results in loading of TiO$_2$ lacking well formed TiO$_2$ phases (in other words, the TiO$_2$ is present in an amorphous or possibly microcrystalline form).

The crystallinity of various Samples was assessed calculating the ratio of peak area for peak positions chosen at 2θ values of 25.2, 27.3 and 30.8 for anatase (A), rutile (R) and brookite (B), respectively. The results are reported in Table 5 wherein the peak width reported was measured at half peak height of the anatase peak at a 2θ value of 25.2 and the ratio of peak area is reported as the ratio of the parameter for the given Sample to that of TiO$_2$ (CON-1) at a 2θ value of 25.2.

As reported in Table 5, the peak width for Sample B-7 and a Sample comprised of 36.4% by weight TiO$_2$ on ZSM5 was quite broad and weak. This lead to the conclusion that the TiO$_2$ in each of these Samples was amorphous. In contrast, it was possible to conclude that the TiO$_2$ in Samples CON-1, CON-2, CON-3, C-7 (alumina support) and D-6 (silica support) was present predominantly in the anatase crystalline form. As will be demonstrated hereinbelow, the presence of this crystallinity in TiO$_2$ is associated with inferior photoactivity. Indeed, with reference to the final Sample reported in Table 5, it will be noted the narrow peak width remains notwithstanding the destruction of the crystallinity of the Sample. In contrast, the peak width for Sample B-7 and a Sample comprised of 36.4% by weight TiO$_2$ on ZSM5 was quite broad and weak. This leads to the conclusion that the interaction of the TiO$_2$ and zeolite in these Samples is different than that of a physical admixture of the TiO$_2$ and zeolite.

TABLE 5

| Sample | Anatase (%) | Rutile (%) | Brookite (%) | Peak Width | Ratio of Peak Area |
|---|---|---|---|---|---|
| CON-3 | 96.6 | — | 3.4 | 1.51 | 33 |
| CON-2 | 88.6 | 7.6 | 3.8 | 0.38 | 90 |
| CON-2 | 85.7 | 14.3 | — | 0.42 | 100 |
| B-7 | AM | AM | AM | ~1.2 | ~18 |
| 36.4% TiO$_2$/ZSM5 | AM | AM | AM | ~0.9 | ~14 |
| D-6 | 93.9 | — | 6.1 | 1.11 | 44 |
| C-7 | 94.6 | — | 5.4 | 1.46 | 44 |
| Mechanical Mixture[1] | — | — | — | 0.40 | 68 |

[1]Mechanically ground mixture of 56% CON-1 and zeolite

The Raman spectra of various Samples were obtained on a Jarrel-Ash Model 25-100 spectrometer interfaced to a microcomputer. The software on the microcomputer allowed for multiple scans. The Raman spectra are provided on FIGS. 4–6.

Figure 4:
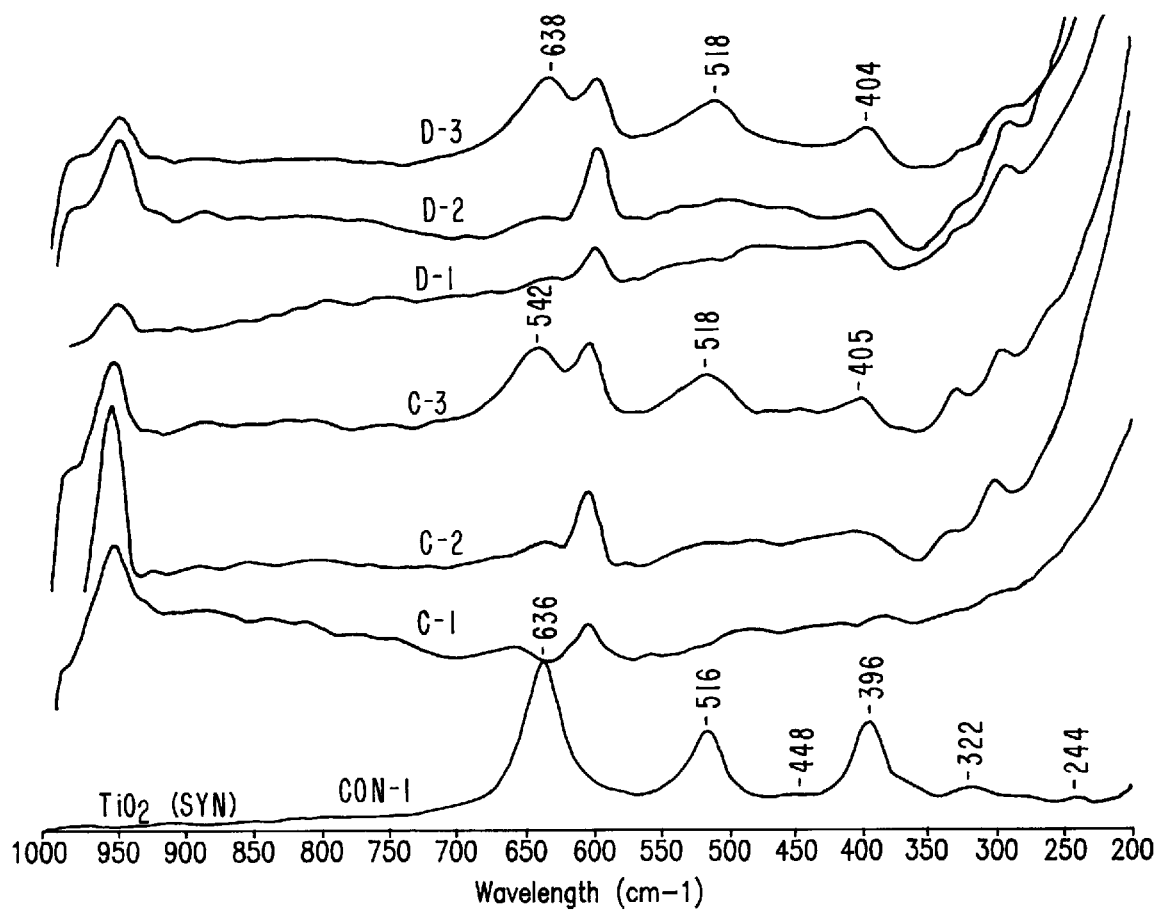
FIG. 4 illustrates various Raman spectra for $TiO_2$ photocatalyst and photocatalyst compounds based on $TiO_2$/alumina and $TiO_2$/silica.

FIG. 4 illustrates the Raman spectra for the following Samples: CON-1, C-1, C-2, C-3, D-1, D-2 and D-3. As will be apparent to those of skill in the art, the spectrum for CON-1 compares favourably with that reported in the literature (see, for example, *Applied Spectrosc.*, 1972, 26, 537 (Capwell et al.), the contents of which are hereby incorporated by reference). This spectrum indicates that TiO$_2$ is predominantly in the anatase crystalline form. As will be further apparent to those of skill in the art, the spectra for Samples C-1 through C-3 and D-1 through D-3 are in satisfactory agreement with assignment of the TiO$_2$ therein being predominately in the anatase crystalline form.

In FIG. 5, there are illustrated various Raman spectra for unsupported and TiO$_2$ supported photocatalyst Samples based on a support material which is ZSM5 zeolite. As illustrated for a TiO$_2$ loading of less than 1.9% on ZSM5, a new band appears at 380cm$^{-1}$. This peak is distinct from the ZSM5 band at 374cm$^{-1}$ and its intensity is greater than the 636cm$^{-1}$ band normally attributed to the presence of anatase crystalline form of TiO$_2$. As the TiO$_2$ loading increases, the new peak shifts toward the 396cm$^{-1}$ frequency which is typically characteristic of anatase crystalline form of TiO$_2$. Concurrently, the ratio of the peak intensity at 638cm$^{-1}$ to that at 380–396cm$^{-1}$ increases. At 9.7% by weight TiO$_2$ loading, the spectrum begins to approach that of TiO$_2$ powder.

FIG. 6 illustrates Raman spectra of unsupported and TiO$_2$ supported photocatalyst based on a support material which is Zeolite A. The various loadings of TiO$_2$ are shown in FIG. 6. These spectra are very similar to those provided in FIG. 5 and serve to distinguish the zeolite loaded TiO$_2$ photocatalyst from photocatalysts loaded on alumina and silica (FIG. 4).

EXAMPLE 2

In this Example, the photocatalytic activity of various of the Samples referred to in Example 1 was assessed. The two substrates chosen for testing photocatalytic activity were: acetophenone and 4-chlorophenol. Photocatalytic activity was evaluated by measuring the loss of the substrates during controlled experiments.

The protocol followed in evaluation of photocatalytic activity was as follows. Prior to commencing illumination, a suspension containing 0.5 grams photocatalyst and 100 mL of approximately 50 ppm acetophenone or 4-chlorophenol was stirred continuously for one hour. The concentration of the substrate in bulk solution at this point was used as the initial value for further kinetic treatment of the photodegradation processes. The decrease in concentration of the substrate in one hour was used for calculation of the extent of substrate adsorption on the specific photocatalyst.

The reactor used was a glass vessel with a flat port window for illumination. The reactor was cooled by water circulation to 20° C. during each experiment. The irradiation source was a 200 W Xenon lamp enclosed in a A1010 lamp housing from PTI and powered to 185 mW with a 250LPS power supply from PTI. A water cell was used as an infrared filter to filter out heat. A 320 nm cut-off filter was placed at the end of the water filter for each experiment with acetophenone and a 350 nm cut-off filter was used for experiments using 4-chlorophenol as the substrate.

Total irradiation time was 3 hours for each experiment. Oxygen was not added to the reaction vessel nor was ambient air removed. At each interval of 15–20 minutes, a 2 mL aliquot of sample was withdrawn by syringe from the irradiated suspension and filtered through a suitable filter membrane. The filtrate was analyzed for acetophenone using a HP 5880 GC instrument with a flame ionization detector and a copper coil column which was packed with 3% OB-225 on Chromosorb™. Analytical determination of 4-chlorophenol and intermediates in oxidation thereof were carried out using a Waters HPLC equipped with a UV-VIS detector and a reverse-phase C$_{18}$ column (MCH10 Varian Associates Inc.). The eluants used comprised a mixture of water, acetonitrile and acetic acid (70:29.8:0.2 v/v)—see *Langmuir*, 1989, 5, 250 (Al-Ekabi et al.), the contents are hereby incorporated by reference.

The photodegradation processes of acetophenone and 4-chlorophenol tended to follow pseudo-first order kinetics in the presence of the photocatalysts tested herein. The loss of the substrate was fitted to the corresponding logarithmic expression:

$$Log[C]_t = -k_{app} t + Log[C]_o$$

wherein $[C]_o$ and $[C]_t$ represent the concentration (ppm) of the substrate in solution at time=0 and time=time of illumination, respectively, and $k_{app}$ represents the apparent rate constant which is also referred to herein as "k".

Figure 7:
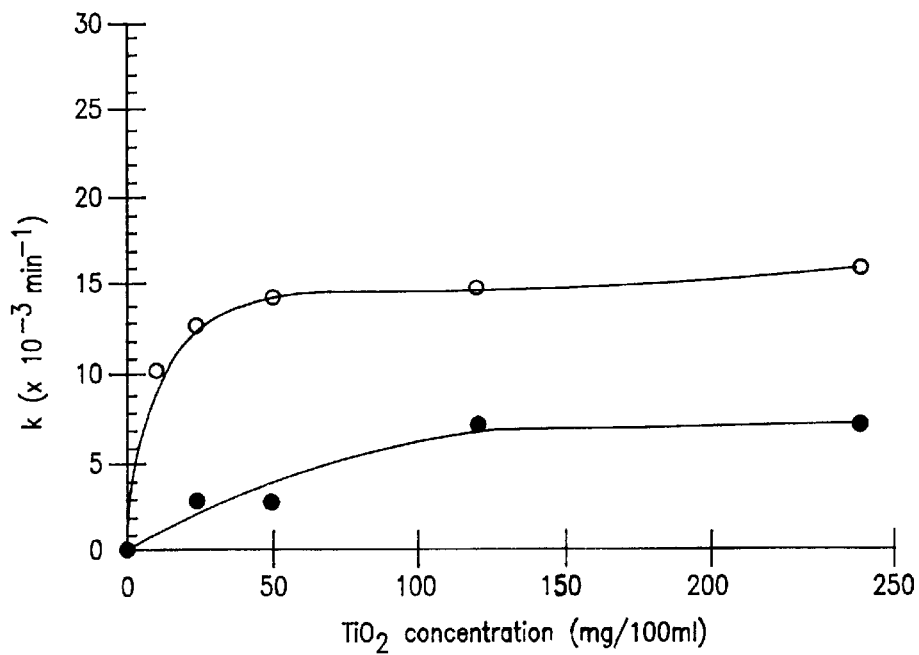
FIG. 7 illustrates the photoactivity of two $TiO_2$ photocatalysts.

No photodegradation of acetophenone or 4-chlorophenol was observed in the presence of any of the support materials (i.e. silica, alumina and the zeolites) when samples were illuminated at a wavelength longer than the longest band in the substrate spectrum ($\lambda$>320nm for acetophenone; $\lambda$>350nm for 4-chlorophenol). The support materials used in each were not observably photocatalytic. As indicated above, in all experiments with the TiO$_2$ photocatalysts where photodegradation of substrates was observed, the degradation kinetics were satisfactorily fit to a first order rate law. Consequently, relative reactivity was measured in terms of trends is the first order rate constant $k_{app}$, obtained under constant illumination as described above. Thus, an increase in $k_{app}$ is indicative of an increase in photoactivity. With reference to FIG. 7, there is illustrated a graph of k versus TiO$_2$ concentration (mg/100 mL) for CON-1 (○) and CON-2 (●). As illustrated, the rate constant k increases with the concentration of TiO$_2$ but approaches a limit and does not increase further above about 1 g/L. This behaviour has been observed in the art and is indicative that, with sufficient loading, all light is absorbed by TiO$_2$ and the further addition of catalysts does not increase reaction. As illustrated, CON-2 is less active as a photocatalyst than CON-1.

Figure 8:
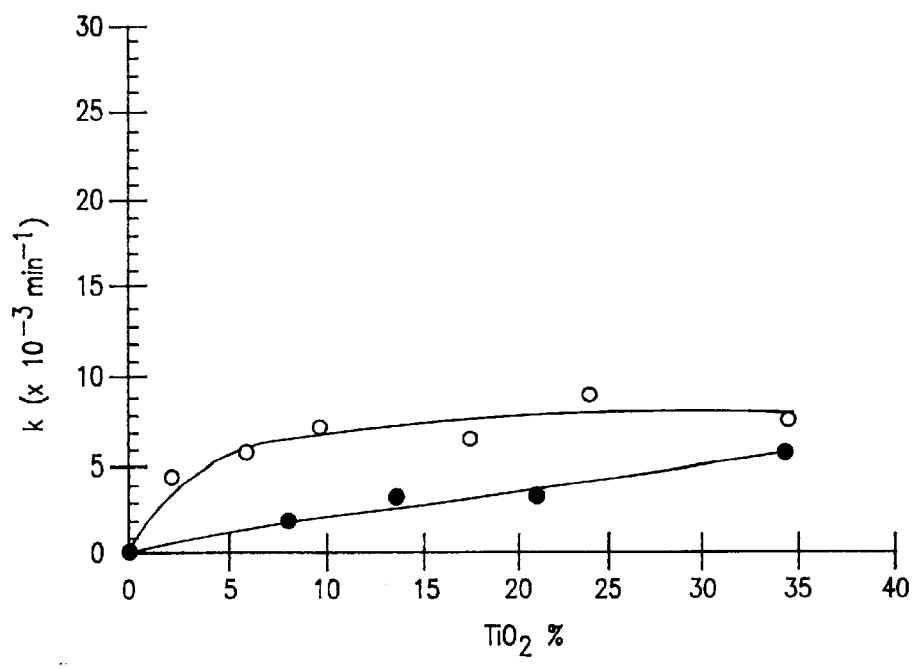
FIG. 8 illustrates the photoactivity of various photocatalyst compounds based on $TiO_2$/silica and $TiO_2$/alumina.

With reference to FIG. 8 there is illustrated a plot of k versus % by weight TiO$_2$ for various samples of TiO$_2$ loaded onto silica (○) and TiO₂ loaded onto alumina (●). In the dark; prior to illumination, the acetophenone concentration decreases by 3% in the presence of 5.0 g/L of the silica supported catalyst. Dark adsorption of acetophenone on the alumina supported catalyst was not detectable under parallel conditions. As shown, at comparable total titanium loading (5 g/L of supported catalyst in FIG. 8 corresponds to 0.5 g/L of TiO₂), the silica supported photocatalyst has the largest value of k amongst those materials tested in FIGS. 7 and 8, and thus is the most efficient.

Figure 9:
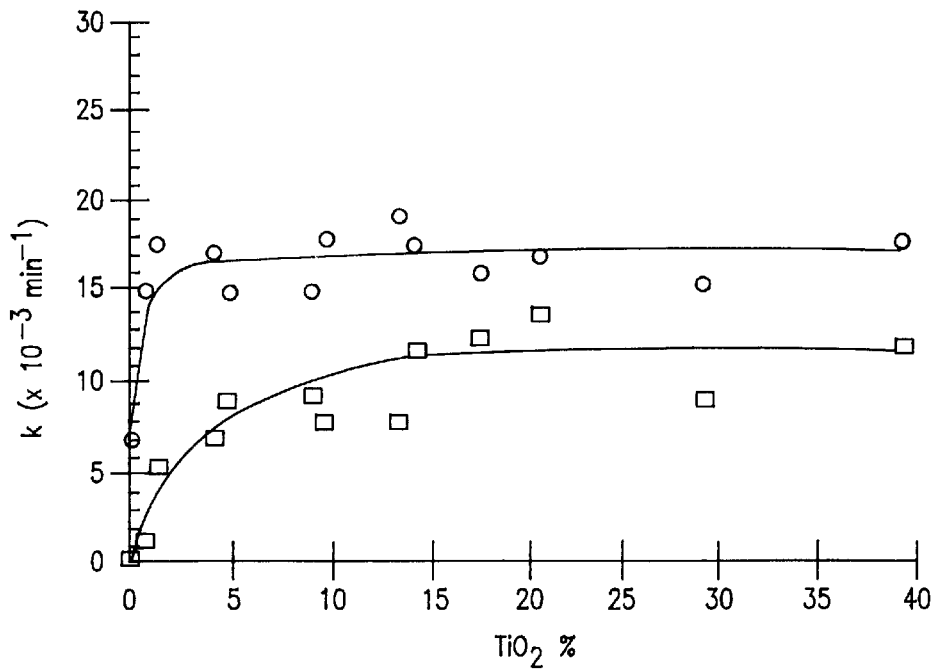
FIG. 9 illustrates the photoactivity of various photocatalysts compounds based on $TiO_2$ and Zeolite A with and without the use of a UV cut-off filter during illumination.
Figure 10:
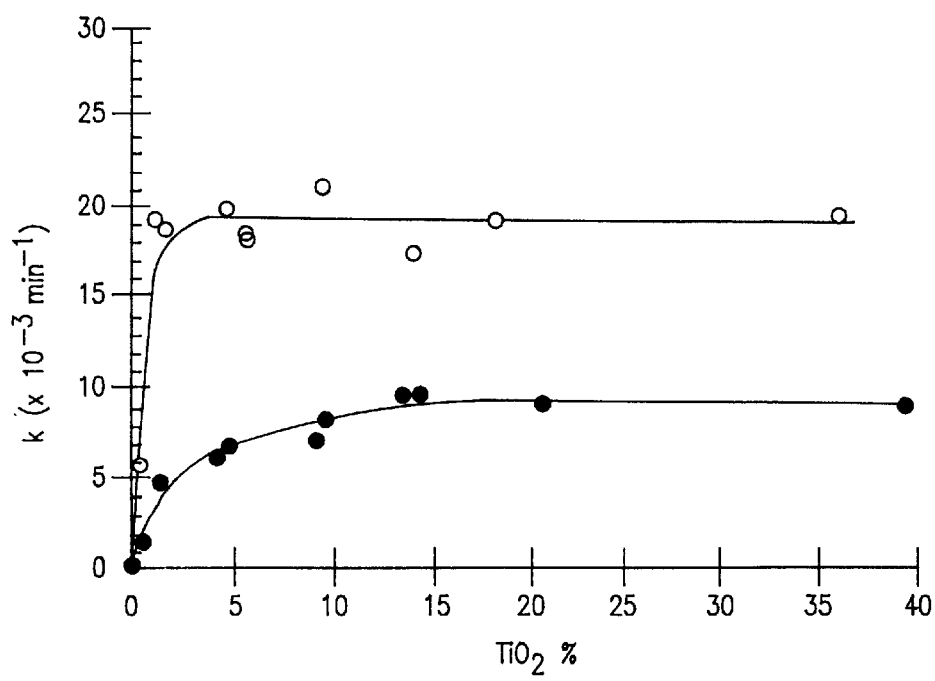
FIG. 10 illustrates a photoactivity comparison between a photocatalyst based on $TiO_2$/ZSM5 and another photocatalyst compound based on $TiO_2$/Zeolite A in the photooxidation of 4-chlorophenol.

With reference to FIG. 9, there is illustrated a plot of k versus % by weight TiO₂ for a series of TiO₂/zeolite A photocatalyst compounds without a UV cut-off filter used during illumination (○) and with a 320 nm cut-off filter used during illumination (□). The substrate used for oxidation was acetophenone. As illustrated, when a zeolite is employed as the support material, photoactivity is enhanced when compared to the photoactivity reported in FIGS. 7 and 8, especially at lower concentrations of TiO₂. Similarly beneficial results were obtained when the substrate was changed to 4-chlorophenol was shown in FIG. 10 wherein there is illustrated a plot of k versus % by weight TiO₂ for a series of TiO₂/ZSM5 photocatalyst compounds (○) and TiO2/zeolite A (●) photocatalyst compounds.

Figure 11:
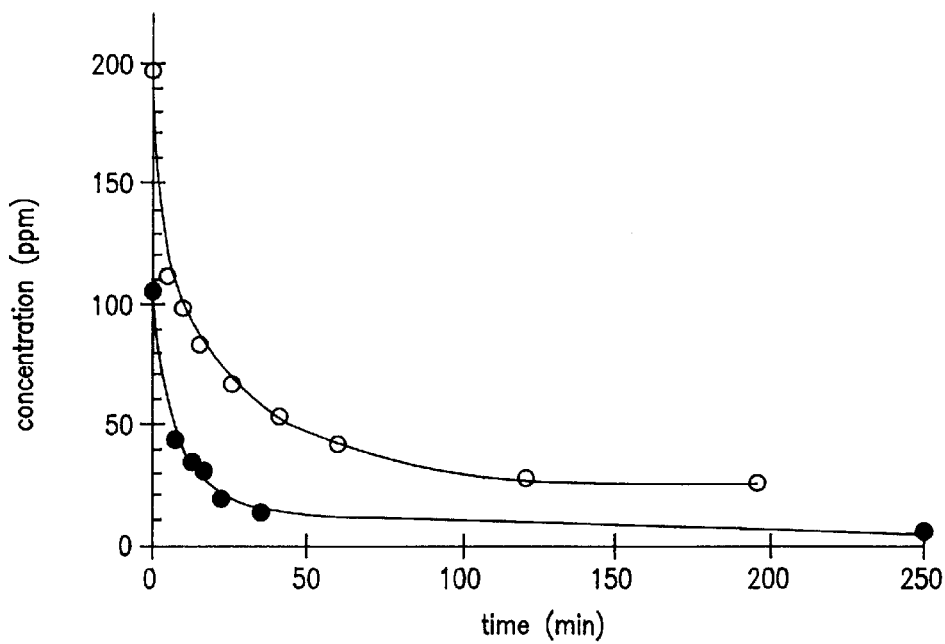
FIG. 11 illustrates a time profile of acetophenone adsorption on ZSM5 under dark conditions.

With reference to FIG. 11, there is illustrated a plot of substrate concentration versus time. Two substrates were used: a 200 ppm acetophenone solution (○) and a 100 ppm acetophenone solution (●). Thus, this study amounted to a time profile of acetophenone adsorption onto ZSM5 zeolite in dark condition for ZSM5 zeolite only. When the ZSM5 zeolite is loaded with TiO₂ as described above, there is no significant loss in the adsorption properties of the photocatalyst compound.

EXAMPLE 3

In this Example, the effect of crystallinity of the zeolite as a support material for the present photocatalyst compound is illustrated. The zeolite used in this Example as Zeolite A. A series of samples with a constant loading of TiO₂ and varying levels of crystallinity were produced via treatment of the photocatalyst with varying concentrations of nitric acid.

Zeolite crystallinity was calculated by determining the area under 8 principle XRD peaks of Zeolite A (2θ from 5° to 35°) compared to the non-acid-treated sample as a standard. The substrate used in this Example was acetophenone since it has a weak adsorption on Zeolite A. In the dark, acetophenone concentration in solution decreased by 2–4% in the presence of 5 g/L of the photocatalyst. There was no significant loss of adsorption on loss of crystallinity.

Figure 12:
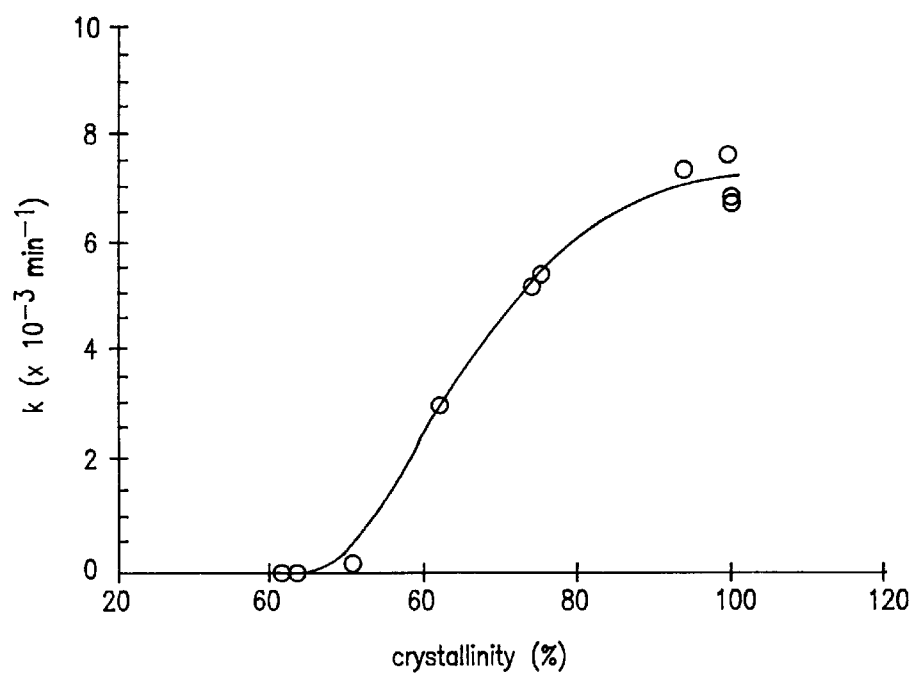
FIG. 12 illustrates the effect of zeolite crystallinity on the photoactivity in acetophenone oxidation of a photocatalyst compound based on $TiO_2$ and Zeolite A.

With reference to FIG. 12, there is illustrated a plot of k versus % crystallinity of the support material in the photocatalyst. As illustrated, photoactivity increased markedly above approximately 50% crystallinity in the support material. This is a surprising and unexpected result.

What is claimed is:

1. A photocatalyst compound comprising: (i) a photocatalyst selected from the group consisting of TiO₂, WO₃ and mixtures thereof, the photocatalyst having an X-ray diffraction pattern which is substantially free of characteristic reflections associated with crystalline TiO₂, WO₃ and mixtures thereof, and (ii) a porous, crystalline, adsorbent support material having a crystallinity of at least about 50%.

2. The photocatalyst compound defined in claim 1, wherein the photocatalyst is TiO₂.

3. The photocatalyst compound defined in claim 1, wherein the support material has a crystallinity of at least about 60%.

4. The photocatalyst compound defined in claim 2, wherein the support material has a crystallinity of at least about 70%.

5. The photocatalyst compound defined in claim 2, wherein the support material has a crystallinity of at least about 85%.

6. The photocatalyst compound defined in claim 1, wherein the support material has an average pore size in the range of from about 5 Å to about 15 Å.

7. The photocatalyst compound defined in claim 1, wherein the support material has an average pore size in the range of from about 5 Å to about 12 Å.

8. The photocatalyst compound defined in claim 1, wherein the support material is zeolite.

9. The photocatalyst compound defined in claim 1, wherein the support material is a hydrophobic zeolite.

10. The photocatalyst compound defined in claim 2, wherein support material is a hydrophobic zeolite comprising a silicon to aluminum weight ratio in the range of from about 10:1 to about 100:1.

11. The photocatalyst compound defined in claim 2, wherein the zeolite is selected from the group consisting of ZSM5, Zeolite A and mixtures thereof.

12. The photocatalyst compound defined in claim 1, wherein the photocatalyst further comprises up to about 5% by weight, based on the total weight of photocatalyst, of at least one transition metal of the Periodic Table.

13. The photocatalyst compound defined in claim 1, wherein the photocatalyst further comprises up to about 2% by weight, based on the total weight of photocatalyst of at least one transition metal of the Periodic Table.

14. The photocatalyst compound defined in claim 1, wherein the photocatalyst further comprises up to about 2% by weight of at least one transition metal selected from the fourth period of the Periodic Table.

15. The photocatalyst compound defined in claim 12, wherein the transition metal is selected from the group consisting of titanium, iron, vanadium, chromium and mixtures thereof.

16. The photocatalyst compound defined in claim 1, wherein the support material is a molecular sieve.

17. The photocatalyst compound defined in claim 1, wherein the support material is a molecular sieve selected from the group consisting of titanium silicates, aluminum phosphates, members of the MCM family and mixtures thereof.

18. The photocatalyst compound defined in claim 2, wherein the TiO₂ is present in an amount of from about 0.5% to about 10% by weight of the photocatalyst compound.

19. The photocatalyst compound defined in claim 2, wherein the TiO₂ is present in an amount of from about 2% to about 8% by weight of the photocatalyst compound.

20. The photocatalyst compound defined in claim 2, wherein the TiO₂ is present in an amount of from about 2% to about 6% by weight of the photocatalyst compound.

21. A process for producing a photocatalyst compound comprising the steps of:
 (i) hydrolysing a non-ionic titanium compound to produce a colloidal suspension having an average particle size of less than about 250 Å;
 (ii) contacting a porous, crystalline, adsorbent support material with the colloidal suspension to produce an impregnated support; and
 (iii) calcining the impregnated support to produce a photocatalyst compound comprising a TiO₂ photocatalyst, the photocatalyst having an X-ray diffraction pattern which is substantially free of characteristic reflections associated with crystalline TiO₂.

22. The process defined in claim 21, wherein the non-ionic titanium compound is selected from the group consisting of $TiCl_4$, $Ti(OR)_4$ and mixtures thereof, wherein R is a $C_1$–$C_{10}$ alkyl group.

23. The process defined in claim 22, wherein R is propyl.

24. The process defined in claim 21, wherein, prior to Step (i), the non-ionic titanium compound is dissolved in a water-miscible organic solvent.

25. The process defined in claim 21, wherein the colloidal suspension has an average particle size in the range of from about 20 Å to about 100 Å.

26. The process defined in claim 21, wherein the colloidal suspension has an average particle size in the range of from about 20 Å to about 75 Å.

27. The process defined in claim 21, wherein Step (ii) is conducted with mixing.

28. The process defined in claim 21, wherein Step (ii) is conducted for a period of at about 1 hour.

29. The process defined in claim 21, wherein Step (ii) further comprises air drying the impregnated support at a temperature in the range of from about 20° to about 150° C.

30. The process defined in claim 21, wherein Step (iii) comprises calcining the impregnated support at a temperature in the range of from about 250° to about 500° C. for a period of at least about 12 hours.

31. A photocatalyst compound comprising: (i) a $TiO_2$ photocatalyst, the photocatalyst having an X-ray diffraction pattern which is substantially free of characteristic reflections associated with crystalline $TiO_2$, and (ii) a porous, crystalline, adsorbent zeolite support material having a crystallinity of at least about 100%,
wherein the photocatalyst is present: (a) in an amount in the range of from about 0.5% to about 10% by weight based on the weight of the photocatalyst compound; and (b) as a layer which substantially completely covers the external surface of the adsorbent zeolite support material.

32. The photocatalyst compound defined in claim 31, wherein the support material has a crystallinity of at least about 85%.

33. The photocatalyst compound defined in claim 31, wherein the support material has an average pore size in the range of from about 5 Å to about 12 Å.

34. The photocatalyst compound defined in claim 31, wherein support material is a hydrophobic zeolite comprising a silicon to aluminum weight ratio in the range of from about 10:1 to about 100:1.

35. The photocatalyst compound defined in claim 31, wherein the zeolite is selected from the group consisting of ZSM5, Zeolite A and mixtures thereof.

36. The photocatalyst compound defined in claim 31, wherein the $TiO_2$ is present in an amount of from about 2% to about 8% by weight of the photocatalyst compound.

37. The photocatalyst compound defined in claim 31, wherein the $TiO_2$ is present in an amount of from about 2% to about 6% by weight of the photocatalyst compound.

* * * * *